United States Patent [19]
Lake

[11] 3,758,743
[45] Sept. 11, 1973

[54] CHUCK ASSEMBLY FOR STUD WELDING APPARATUS

[75] Inventor: John W. Lake, Audubon, N.J.

[73] Assignee: Omark Industries, Inc., Portland, Oreg.

[22] Filed: June 30, 1970

[21] Appl. No.: 51,127

[52] U.S. Cl. .................... 219/98, 29/212 T, 279/43, 279/51
[51] Int. Cl. ............................................. B23k 9/20
[58] Field of Search .............. 219/75, 98, 99, 150.5; 29/212 T; 279/43, 38, 56, 51, 185, 147

[56] References Cited
UNITED STATES PATENTS

| | | | |
|---|---|---|---|
| 3,293,402 | 12/1966 | Graham | 219/98 |
| 3,348,291 | 10/1967 | Niedzwiecki | 29/212 T |
| 2,056,963 | 10/1936 | Fuchs et al. | 279/43 |
| 3,352,996 | 11/1967 | Neumeier | 219/98 |

Primary Examiner—R. F. Staubly
Attorney—Charles F. Duffield

[57] ABSTRACT

A chuck assembly for automatically ram feeding large diameter flange studs. A chuck body has a first resilient chuck disposed at one end thereof and a reciprocating second resilient chuck movable through the body from a first loading position past a passageway to which the studs are loaded to the loading chamber to a second welding position concentric within the first chuck. The dimension of the first chuck is such as to retain the flange of the stud and the dimension of the second chuck is such as to pick-up the shank of the stud and support it as the stud is ram fed through the first chuck into welding position during which the fingers of the first chuck grip the fingers of the second chuck to aid in supporting the stud.

7 Claims, 3 Drawing Figures

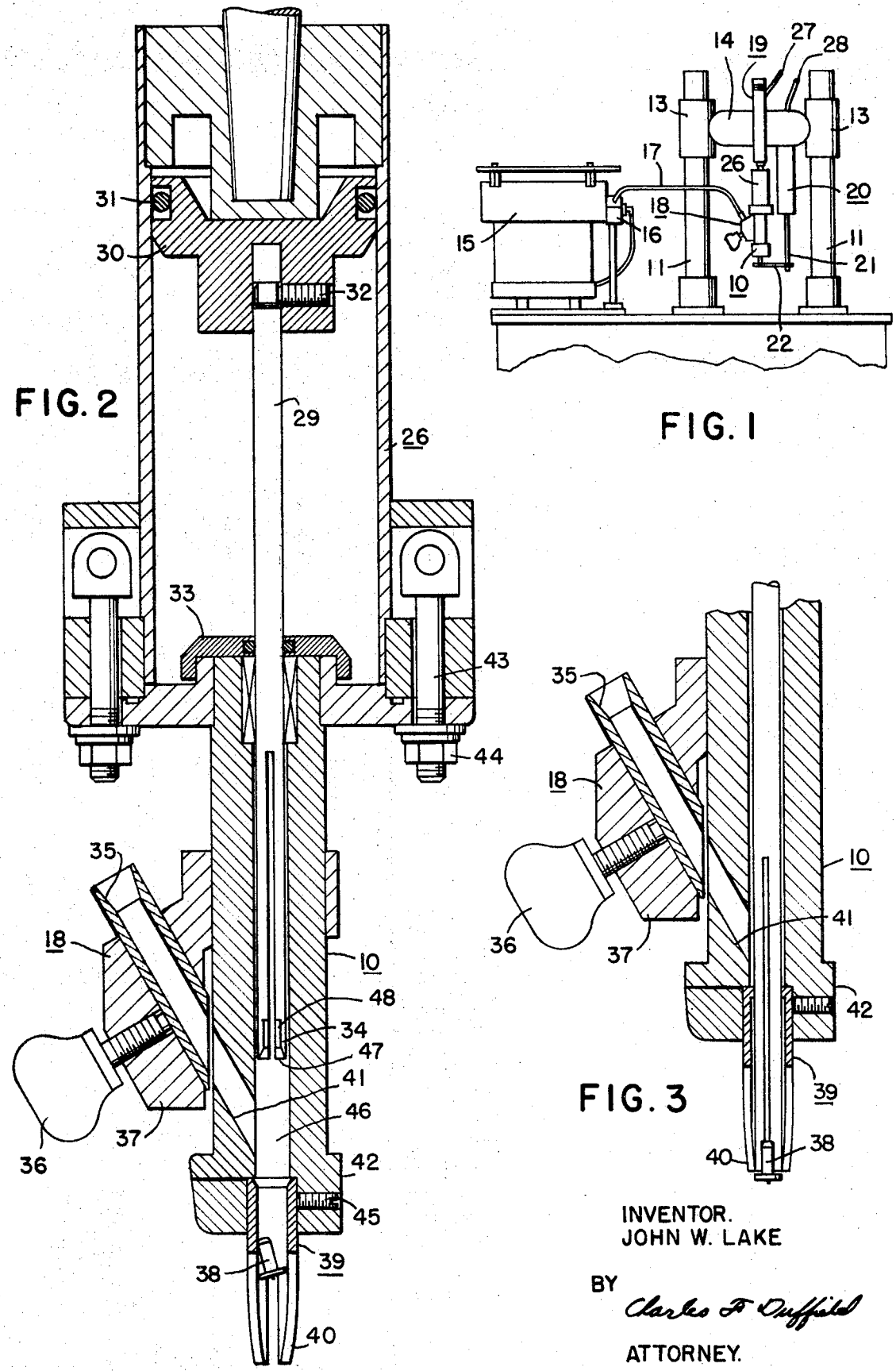

CHUCK ASSEMBLY FOR STUD WELDING APPARATUS

BACKGROUND OF INVENTION

The present invention relates to chuck assemblies for stud welding apparatus and, more specifically, to chuck assemblies used in automatic ram feeding of large diameter flanged studs.

In stud welding apparatus, a stud is secured in a metallic chuck with one end thereof projecting beyond the chuck. The stud is then positioned adjacent the workpiece to which it is to be welded. During the welding operation, a high intensity current is passed through the chuck and stud secured therein across the stud and workpiece resulting in melting of the contiguous portions of the stud and workpiece with the resultant fusion bonding of the two together upon solidification. During this operation, it is extremely important that the stud be in good electrical contact with the chuck or else arcing between the stud and the chuck will occur.

There are two fundamental ways which studs may be loaded into a chuck. The first is to insert the stud externally of the welding gun into the chuck from an external loading position. The studs may be loaded by hand in this manner or from an automatic loading station positioned below the chuck. In a loading station such as this, the studs will be loaded and then the loading station will be swung out of interference with the chuck after which the welding gun will advance into loading position adjacent the workpiece.

The second fundamental mode of loading the stud is to dispatch the stud to the rear of the chuck. A ram rod located out of interference with the loading passage in the rear of the chuck then advances pushing the stud from the rear to the forward end of the chuck and into its welding position. This type of mechanism is advantageous in that the welding area is unobstructed by the external loading apparatus as in the first case.

The second mode of ram feeding generally employs a chuck which has a plurality of resilient fingers which will offer sufficient resistence to the stud in being ram fed through the chuck to assure good electrical contact between the chuck and the stud. This type of chuck works well on straight shank studs and studs having very minimum flange areas.

However, considerable problems arise with the single resilient finger type chuck in ram feedings studs having a relatively large diameter flange in comparison to the shank of the stud. The difficulty is essentially that the single chuck must be capable of expanding sufficiently to pass the enlarged flange of the stud and, at the same time, capable of closing upon the shank of the stud with sufficient force to insure good electrical contact. The larger the flange is in relation to the shank of the stud, the more difficult the problem becomes. Even where the chuck can be made of sufficiently resilient material to close upon the shank, difficulty has been encountered in short life of the chuck due to the extreme stresses which are placed upon the fingers of the chuck in expanding and contracting through the relatively large range.

SUMMARY AND OBJECTS OF INVENTION

The disadvantages of the single ram feed type chuck assembly of the prior type are overcome by the present invention which provides a chuck assembly which employs a stationary external chuck and a movable internal chuck which co-operate to support both the flange and the shank of the stud and which avoid undo stress on the chucks. The first chcuk is disposed at the end of a chuck body which body includes an internal loading chamber therein which is in communication with both a passageway for feeding studs and the receiving end of the first chuck. The first chuck is so dimensioned that the fingers, in closed position, will retain the flange of the stud. A second movable internal chuck is provided which is reciprocally movable through the loading chamber into concentric position within the first chuck. The second chuck moves to a retracted loading position out of interference with the passageway through which the studs are loaded into the loading chamber with the flange end in advanced position. The internal chuck then moves into engagement with the shank of the stud thus picking up and supporting the shank of the stud and raming the flange of the stud through the first chuck into loading position. In the loading position, the fingers of the first chuck resiliently grip the fingers of the internal chuck to aid in the internal chuck in gripping or supporting the shank of the stud.

Other objects and advantages of the present invention will be apparent from the detailed description thereof which follows taken in conjunction with the drawing.

DESCRIPTION OF DRAWINGS

FIG. 1, is a side elevation of the stud welding apparatus in which the chuck assembly of the present invention is employed;

FIG. 2, is a sectional view through the chuck assembly of the present invention in loading position and, FIG. 3, is a partial sectional view through the lower part of the chuck assembly in welding position.

DETAILED DESCRIPTION OF INVENTION

Shown in FIG. 1 of the drawings is the overall stud welding apparatus in which the chuck assembly of the present invention may be employed. The assembly includes a chuck body 10 and piston assembly 26 both of which will be described in more detail hereinafter. The chuck body 10 and piston assembly 26 are carried by a stationary piston assembly 19 supported by a crossover bar 14 which is likewise adjustably supported upon uprights 11 secured to a main welding table.

By way of general operation, a signal from a stud welding controller (not shown) to a feeding mechanism 16 will cause a stud to be passed into an escapement mechanism 16 which stud is then blown through tube 17 to a loading station 18 where it will be passed within the chuck assembly comprising the present invention and loaded into welding position as hereinafter described.

After the stud is loaded, a rotary work table 22 on which the article to which the stud is to be welded has been placed, is rotated in welding position by means of air pressure into cylinder 20 through a supply line 28 all in accordance with a preplanned sequence programmed into the controller (not shown) of the welding apparatus. Thereafter, the chuck assembly 10 and piston assembly 26 are lowered into welding position by means of the stationary piston assembly 19 operated through an air line 27 all under the control of the controller. The weld is then carried out in a manner well known in the art.

Turning now from the general environment in which the chuck assembly of the present invention is employed, reference is made to FIGS. 2 and 3 of the drawing. In FIG. 2, the chuck assembly is shown in the loading position. A first or external chuck 39 is secured at its upper end to the chuck body 10 by means of a set screw 45.

The entire chuck body 10 is supported to the piston assembly 26 by means of a pair of bolt and nut assemblies 43 and 44 which will permit easy and quick removal of the chuck assembly 10 and ramrod 29 for replacement with another setup designed for a different size stud.

Disposed within the piston assembly 26 is a piston 30. The piston 30 is suitably sealed by means of gaskets 31 and 33 in order that pneumatic pressure on either side of the piston will cause the piston to move longitudionally within the cylinder. The piston 30 is connected to the ramrod 29 by means of set screw 32. The ramrod 29 extends into a longitudional loading chamber 46 running the length of the chuck body 10.

The ramrod 29 terminates in a second internal chuck 34. The length of the chuck 34 is such that the end thereof will be out of interference with a loading passage 41 in the chuck body 10 whenever the piston 30 is in its upper most retracted position. The passageway 41 is in communication with the terminal end 35 of the loading tube 17. The terminal end 35 is held in place at the loading station 18 by means of a thumb screw 36 which secures the terminal end within a mounting block 37.

When the chuck assembly is in the position as shown in FIG. 2, as tud 38 will be blown through the delivery tube 17 to the loading station 18 with its large flange end leading. The stud can pass through the terminal end 35, passageway 41 and into the mid portion of the chuck 39 as shown in FIG. 2.

The first or external chuck 39 employs a plurality of resilient fingers 40. The closed or unflexed dimension of the fingers is such that they will retain the flange of the stud 38 thus preventing the stud from passing through the chuck. Nevertheless, the fingers are sufficiently resilient to permit the flange of the stud to pass through the fingers without unduly stressing them during the loading sequence within the chuck.

After the stud 38 has been loaded within the first chuck 39 as shown in FIG. 2, the stud welding controller initiates a command which will lower the piston 30 to the position shown in FIG. 3. The chuck 34, as it advances through the loading chamber 46, will first encounter the shank end of the stud 38. Diverging relieved sections 47 on the end of the second chuck 34 will cause the shank end of the stud to align itself with the axis of the second chuck and to pass within the fingers of the second chuck 34. A suitable angle for the relieved sections has been found to be 30 percent from the axis of the chuck.

As the chuck 34 continues to advance, the shank of the stud will pass firmly into gripping engagement with the chuck fingers until the end of the shank comes to rest against an internal shoulder 48 disposed back of the end of the second chuck. The shoulder is positioned back of the end of the chuck a distance slightly less than the length of the shank of the stud in order that the flange of the stud will not contact the end of the internal chuck. This is done in order to prevent arcing between the flange of the stud and the end of the internal chuck during the welding operation.

Once the shank of the stud has come to rest against the shoulder 48, the continued movement of the second chuck 34 through the loading chamber 46 will force the flange of the stud through the resilient fingers 40 of the external chuck. When the piston 30 has reached the limit of its travel, the internal chuck 34 will have passed concentrically within the external chuck 39 to its opposite end and to a position at which the flange of the stud 38 is projecting from the fingers of the external chuck 39 as shown in FIG. 3.

The external dimensions of the fingers of the chuck 34 are such that they will be in slight interference with the internal dimension of the fingers of the chuck 39 whenever the internal chuck is positioned concentrically within the internal chuck as shown in FIG. 3. In this position, the external chuck then aids the internal chuck in gripping the shank of the stud in order to insure good electrical contact between the chucks and the stud.

From the foregoing, it will be appreciated that the chuck assembly of the present invention permits ram feeding of studs regardless of the size of the flange thereof relative to the shank. By means of the present invention, the ordinary expandable finger type of chuck may be employed for the large diameter studs without resorting to more expensive and complicated chuck assemblies.

The foregoing invention has been described in respect to a particular embodiment thereof. However, it will be appreciated that no limitation in the scope of the invention has been thus intended but the scope thereof is to be interpreted within the spirit and tenor of the accompanying claims.

I claim:

1. A chuck assembly for automatically loading welding studs which have a shank terminating in a relatively enlarged flange comprising;

a first external chuck having resilient gripping elements suitably dimensioned to support and expand to pass the flange of the stud, a second internal chuck having resilient gripping elements externally dimensioned to pass concentrically within said first chuck in gripping engagement therewith and internally dimensioned to support the shank of the stud, an elongate loading chamber having an axis common with said first and second chucks and in communication therewith and of cross section substantially that of the flange of the stud being loaded, means to move said second chuck between a first position concentric within the first chuck through the loading chamber to a second position at the opposite end of the loading chamber, and means for supplying studs to the loading chamber with the shank portion thereof aligned toward the second chuck when the second chuck is in its second position whereby the second chuck, upon being moved to the loading position concentric within the first chuck, will first pick-up and support the shank of the stud and pass the flange of the stud through the gripping elements of the first chuck into welding position.

2. The chuck assembly of claim 1 wherein the gripping elements on the second chuck include a diverging relieved section at a receiving end thereof which cooperates with the end of the shank of the stud to aid in loading the shank of the stud into the second chuck.

3. The chuck assembly of claim 1 wherein the second chuck includes an internal shoulder spaced from the receiving end of the chuck a distance less than the length of the shank of the stud being loaded to insure that the flange of the stud does not engage the receiving end of the second chuck to prevent arcing during welding of the stud.

4. A chuck assembly for a stud welding gun suitable for receiving and positioning a welding stud having an elongate shank terminating in a relatively large flange comprising;
   a first chuck having resilient fingers at one end thereof and having a normal closed dimension less than the diameter of the flange.
   means for delivering the stud to the first chuck with its flange end first, and
   a second chuck movable axially through said first chuck and including resilient fingers having an inside dimension to pick-up and receive the shank of the stud in gripping relationship and an outside dimension to pass into gripping relationship with the fingers of the first chuck whereby the first chuck will retain the stud until picked up by the second chuck and thereafter aid the second chuck in retaining the stud after the flange of the stud in extended past the fingers of the first chuck and into welding position.

5. A chuck assembly for automatically loading welding studs having a shank terminating in a flange comprising;
   a chuck body including a loading chamber,
   a stud carrier including gripping elements upon one end thereof supported for longitudinal movement through the loading chamber to a welding position,
   means for delivering studs to the loading chamber with the shank thereof adjacent the carrier and substantially in line therewith,
   yieldable means for retraining the stud flange within the loading chamber and,
   means for moving the stud carrier into welding position through the loading chamber into gripping engagement with the shank of the stud and past the yieldable means.

6. A chuck assembly used in stud welding apparatus for automatic ram feeding of large diameter flange studs comprising;
   a chuck body having an elongate loading chamber therein,
   an outer resilient chuck carried by the chuck body at a first end thereof and in communication with said loading chamber and having a closed dimensioned less than the diameter of the flange of the stud to be loaded but capable of expanding to pass the flange of the stud,
   a delivery passage through the chuck body and in communication with the loading chamber,
   means for dispatching studs, flange end first, through the delivery passage and loading chamber into the outer chuck,
   a second resilient chuck reciprocally movable within said chuck body between a first position out of interference with the passageway and a second position concentric within and substantially to the opposite end of the first resilient chuck, said second chuck having a closed dimension less than the shank dimension of the stud being loaded and outside diameter, when a stud is loaded therein, in excess of the closed dimension of the first chuck, and
   means for moving the second chuck from its first position to its second position following dispatch of a stud to the first chuck whereupon the second chuck will pick-up and support the shank of the stud and ram feed the flange of the stud through the first chuck into loading position at which the interference between the first and second chuck will aid in supporting the shank of the stud in its welding position.

7. A stud welding tool, for use with a stud including a head, having a plunger, means for reciprocating the plunger, a loading body having a loading chamber for receiving the studs, said body being connected to said tool with the chamber being aligned with the plunger and located in the path thereof, said body having a transverse inlet and means for feeding studs to the chamber one at a time through the transverse inlet including a supply tube communicating with the transverse inlet and a chuck engaged to the forward end of the welding tool in alignment with the chamber, the chuck having its forward end divided into a series of spaced fingers, the forward end of the fingers being angled inwardly to provide an internal diameter smaller than the diameter of the stud head, a split sleeve attached to the plunger, the split sleeve having a front end whose diameter is larger than the internal diameter of the chuck and is adapted to be compressed to a smaller diameter as it passes through the chuck thereby engaging the shank of the headed stud.

* * * * *